(12) United States Patent
Cai et al.

(10) Patent No.: US 9,977,503 B2
(45) Date of Patent: May 22, 2018

(54) APPARATUS AND METHOD FOR AN INFRARED CONTACTLESS GESTURE SYSTEM

(71) Applicant: QUALCOMM Incorporated, San Diego, CA (US)

(72) Inventors: Ning Cai, San Diego, CA (US); Jangwon Lee, San Diego, CA (US); An M. Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 13/692,949

(22) Filed: Dec. 3, 2012

(65) Prior Publication Data

US 2014/0152539 A1 Jun. 5, 2014

(51) Int. Cl.
*G06F 3/01* (2006.01)
*G06F 3/03* (2006.01)
*G02B 27/01* (2006.01)

(52) U.S. Cl.
CPC ........... *G06F 3/017* (2013.01); *G02B 27/017* (2013.01); *G06F 3/011* (2013.01); *G06F 3/0304* (2013.01); *G02B 2027/014* (2013.01); *G02B 2027/0178* (2013.01)

(58) Field of Classification Search
CPC .................. G06F 33/0421; G06F 33/0428
USPC ........................................................ 345/156
See application file for complete search history.

(56) References Cited

U.S. PATENT DOCUMENTS

| 6,495,832 | B1 * | 12/2002 | Kirby ................. G01V 8/20 250/222.2 |
| 8,199,126 | B1 | 6/2012 | Taubman |
| 8,217,856 | B1 | 7/2012 | Petrou |
| 8,319,745 | B2 | 11/2012 | Lapstun et al. |
| 8,319,746 | B1 * | 11/2012 | Ho et al. .................. 345/173 |
| 8,823,643 | B1 * | 9/2014 | Biswell ............... G06F 3/0421 345/156 |
| 2006/0086896 | A1 * | 4/2006 | Han .................... G06F 3/0421 250/221 |
| 2006/0114237 | A1 * | 6/2006 | Crockett et al. .......... 345/173 |
| 2007/0220108 | A1 | 9/2007 | Whitaker |
| 2009/0139778 | A1 | 6/2009 | Butler et al. |
| 2010/0045530 | A1 * | 2/2010 | Van De Wijdeven .......... G06F 3/0421 342/463 |
| 2010/0079356 | A1 | 4/2010 | Hoellwarth |

(Continued)

FOREIGN PATENT DOCUMENTS

CN 101890719 A 11/2010
CN 102622132 A 8/2012

(Continued)

OTHER PUBLICATIONS

International Search Report and Written Opinion—PCT/US2013/071453—ISA/EPO—dated Feb. 27, 2014.

*Primary Examiner* — Robin Mishler
(74) *Attorney, Agent, or Firm* — The Marbury Law Group/Qualcomm (57) ABSTRACT

An apparatus, a method, and a computer program product are provided. The apparatus generates at least one signal in response to a contactless gesture performed proximate to an infrared proximity sensor situated on the optical device, the contactless gesture corresponding to a command, identifies the command using the at least one signal, and executes the command.

22 Claims, 6 Drawing Sheets

(56) References Cited

U.S. PATENT DOCUMENTS

| | | | |
|---|---|---|---|
| 2010/0295773 A1 | 11/2010 | Alameh et al. | |
| 2010/0299642 A1* | 11/2010 | Merrell et al. | 345/156 |
| 2011/0102378 A1 | 5/2011 | Kim et al. | |
| 2011/0194029 A1 | 8/2011 | Herrmann et al. | |
| 2011/0310005 A1* | 12/2011 | Chen et al. | 345/156 |
| 2012/0021806 A1 | 1/2012 | Maltz | |
| 2012/0056847 A1 | 3/2012 | Milford | |
| 2012/0062445 A1 | 3/2012 | Haddick et al. | |
| 2012/0120103 A1 | 5/2012 | Border et al. | |
| 2012/0188206 A1* | 7/2012 | Sparf | G06F 3/042 345/175 |
| 2012/0194478 A1 | 8/2012 | Liu et al. | |
| 2012/0312956 A1* | 12/2012 | Chang et al. | 250/201.1 |
| 2013/0106686 A1* | 5/2013 | Bennett | G06F 3/017 345/156 |

FOREIGN PATENT DOCUMENTS

| | | |
|---|---|---|
| DE | 102006020570 A1 | 11/2007 |
| WO | WO-2011082004 A1 | 7/2011 |

\* cited by examiner

APPARATUS AND METHOD FOR AN INFRARED CONTACTLESS GESTURE SYSTEM

BACKGROUND

Field

The present disclosure relates generally to an apparatus and method for an infrared contactless gesture system.

Background

Systems and applications for implementing Augmented Reality (AR) have become very popular and widespread, since AR allows users to interact with their surroundings in a new way. For example, AR may display data about a user's surroundings in real time and present such data to a user in a natural way. Although many AR applications may be run on smartphones and tablets, the most natural form factor for implementing AR systems are optical devices, such as glasses.

The conventional methods for interacting with such AR glasses include voice commands or button presses on the AR glasses. However, such methods suffer from significant drawbacks. For example, a user may not be able to control the AR glasses in an area requiring silence (e.g., in a meeting or theater). User's that are not capable of speaking cannot control the AR glasses and voice command accuracy is significantly affected by voice quality and ambient noises. Moreover, voice recognition must be configured to support different languages. Finally, pressing buttons on glasses may be uncomfortable and inconvenient to users.

SUMMARY

In an aspect of the disclosure, an apparatus, a method, and a computer program product are provided. The apparatus generates at least one signal in response to a contactless gesture performed proximate to an infrared proximity sensor situated on the optical device, the contactless gesture corresponding to a command, identifies the command using the at least one signal, and executes the command.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of an infrared contactless gesture system will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 1:
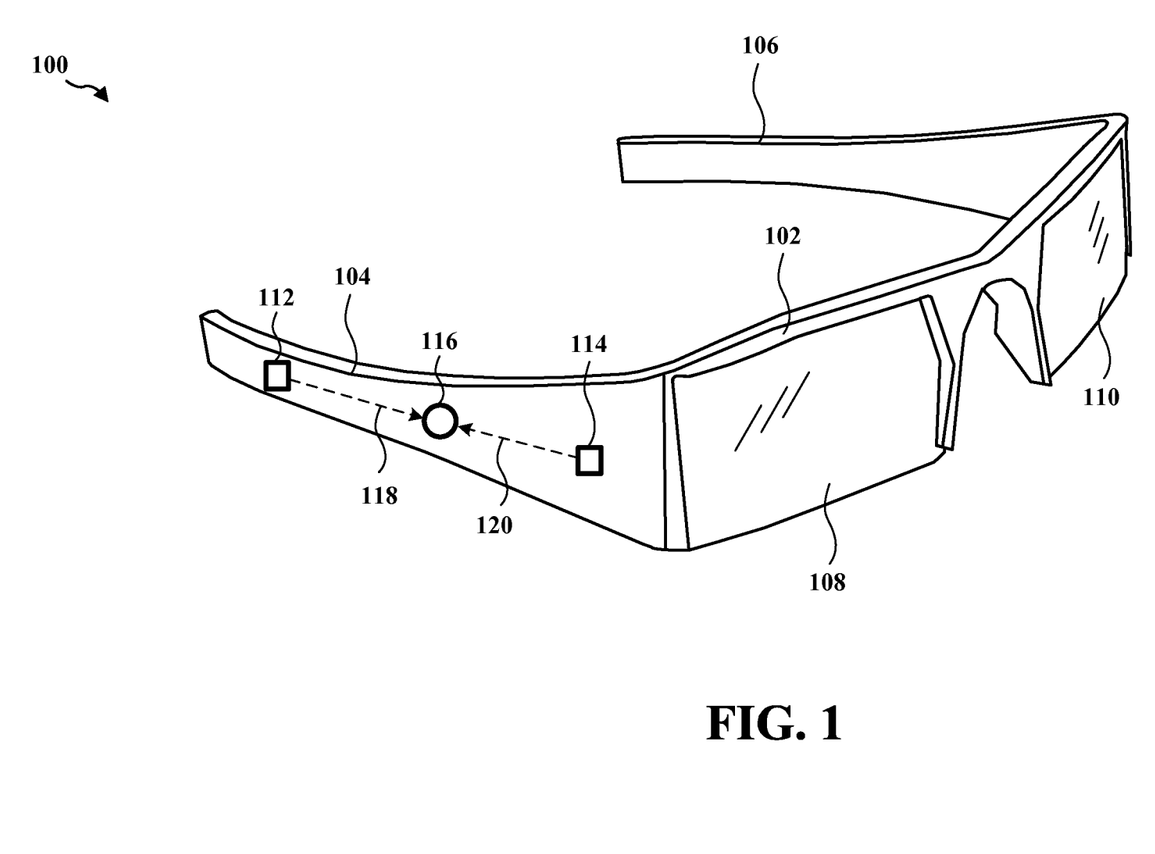
FIG. 1 is a diagram illustrating an optical device configured to display content.

FIG. 1 is a diagram illustrating an optical device 100 configured to display content. As shown in FIG. 1, the optical device 100 includes a frame 102, temple portions 104 and 106, and lenses 108 and 110 mounted on the frame 102. The optical device 100 further includes a receiver 116 and transmitters 112 and 114 situated along temple portion 104. In one aspect, the transmitters 112 and 114 may be infrared light emitting diodes (IR LEDs) and the receiver 116 may be an infrared (IR) sensor (also referred to as an "IR proximity sensor"). It should be understood that additional or fewer transmitters may be included on optical device 100.

In one aspect, the optical device 100 may be configured as an augmented reality (AR) display (also referred to as "AR glasses"). In such an aspect, the optical device 100 may be configured to project content, such as AR imagery, through the lens 108 and/or lens 110 using methods known in the art. In another aspect, the optical device 100 may be configured to project content through the lens 108 and/or lens 110, such as a movie or an electronic book (also referred to as an "e-book"). As described infra, the optical device 100 may be configured with a user interface (UI) that allows interaction with the optical device 100 using contactless gestures. A contactless gesture refers to a gesture that is performed without making physical contact with the optical device 100.

In one aspect, with reference to FIG. 1, the UI may include the transmitters 112 and 114 and the receiver 116 for detecting contactless gestures performed by a user of the optical device 100. The UI may further include software configured to recognize the contactless gestures and to control applications. In the configuration of FIG. 1, the receiver 116 is situated between transmitters 112 and 114. The receiver 116 may sense a signal from each of transmitters 112 and 114, such as signals 118 and 120. For example, the signals 118 and 120 may be IR signals. The user may perform a contactless gesture by obstructing the signal 118 and/or signal 120 with her hand or with one or more of her fingers. The receiver 116 may detect when the signal 118 and/or signal 120 has been obstructed and may generate one or more signals corresponding to the detected obstructions. For example, a user may perform a contactless gesture, such as a right swipe from transmitter 112 to transmitter 114, by first momentarily obstructing signal 118 and then momentarily obstructing signal 120. Accordingly, the receiver 116 may generate a signal corresponding to such a sequence of obstructions of the signals 118 and 120. In one aspect, the receiver 116 may generate a different signal for each contactless gesture performed by a user, such as a gesture from transmitter 114 to transmitter 112 (left swipe), a gesture from transmitter 112 to transmitter 114 (right swipe), a push/pull gesture on or proximate to the receiver 116 (center tap), a push/pull gesture on or proximate to the transmitter 114 (front tap), and a push/pull gesture on or proximate to the transmitter 112 (rear tap).

Each contactless gesture, that is, each signal generated by the receiver 116 in response to a contactless gesture, may correspond to one or more commands. In one configuration, each signal generated by the receiver 116 in response to a contactless gesture may be mapped to one or more commands. Accordingly, when a user performs a contactless gesture to input a command, the optical device 100 may use the signal generated by the receiver 116 in response to the contactless gesture to identify the command. For example, the command may be an action or menu selection that may be executed by an application, such as an AR application, a movie application, or an e-book application.

For example, a right swipe contactless gesture may correspond to a command for zooming out in a camera application or a map application, a command for selecting an item on a list from top to bottom in a media player application, a command for scrolling down a page in an e-book application, and/or a command for setting focus on application icons one by one from left to right in an application menu. A left swipe contactless gesture may correspond to a command for zooming in on a camera application or a map application, a command for selecting an item on a list from bottom to top in a media player application, a command for scrolling up a page in an e-book application, and/or a command for setting focus on application icons one by one from right to left in an application menu. A center tap contactless gesture may correspond to a command for exiting a current application. A front tap contactless gesture may correspond to a command for taking a picture in a camera application, a command accepting a conversation request, a command for going to a next page in an e-book application, and/or a command for increasing the volume in a media player application or during a conversation. A rear tap contactless gesture may correspond to a command for saving a picture in a camera application, a command for rejecting a conversation request, a command for going to a previous page in an e-book application, and/or a command for decreasing the volume in a media player application or during a conversation.

In one aspect, the transmitters 112 and 114 and the receiver 116 may be situated on temple portion 106 instead of temple portion 104. In another aspect, additional transmitters and a receiver may be situated on temple portion 106 using a same or different configuration as transmitters 112 and 114 and the receiver 116. The additional transmitters and the receiver may be included on optical device 100 to supplement the number of available commands.

Figure 2:
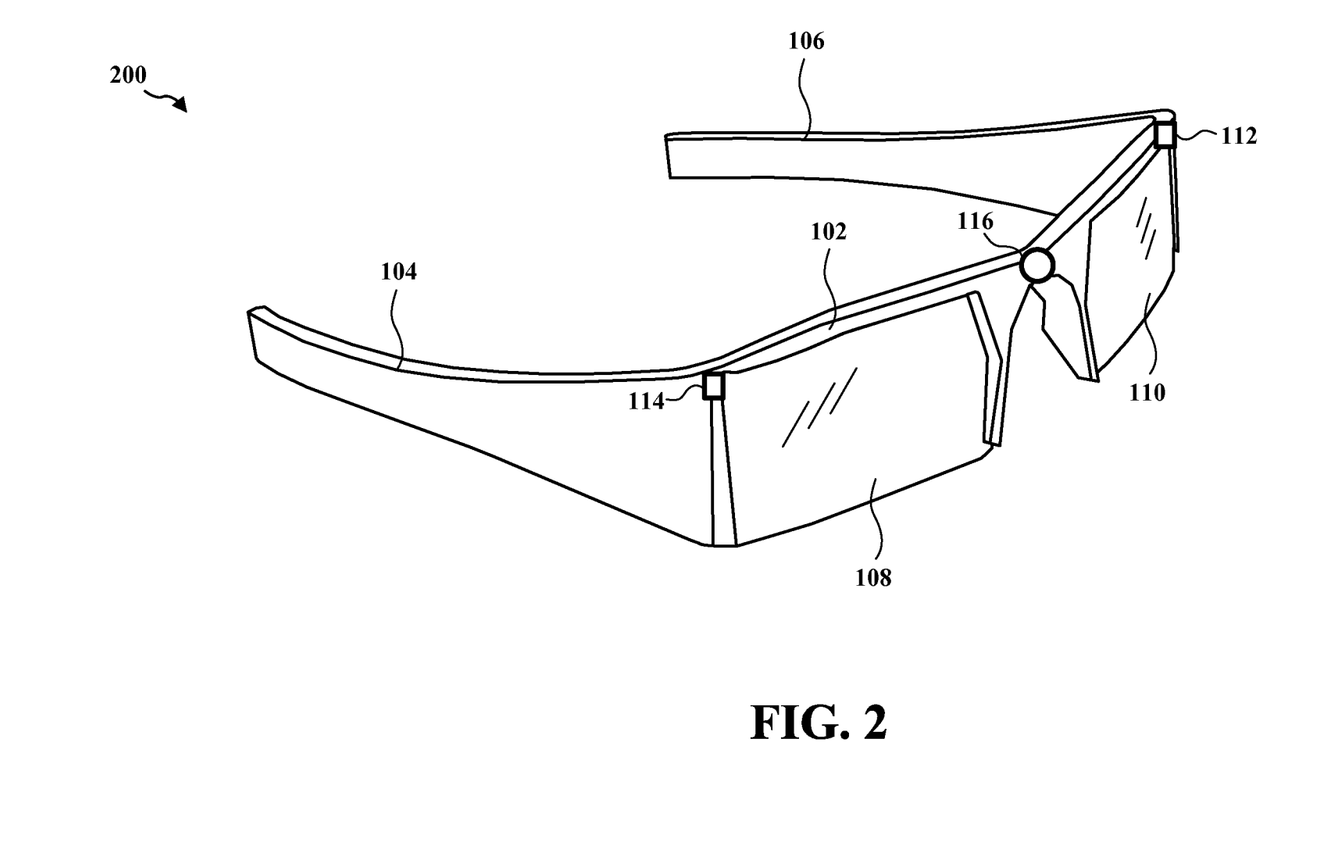
FIG. 2 is a diagram illustrating an optical device configured to display content.

FIG. 2 is a diagram illustrating an optical device 200 configured to display content. In one aspect, the transmitters 112 and 114 and the receiver 116 may be situated on a front portion of the optical device 200 as shown in FIG. 2. Accordingly, the configuration of FIG. 2 may support several contactless gestures, such as a gesture from transmitter 114 to transmitter 112 (left swipe), a gesture from transmitter 112 to transmitter 114 (right swipe), a push/pull gesture on or proximate to the receiver 116 (center tap), a push/pull gesture on or proximate to the transmitter 112 (left tap), and a push/pull gesture on or proximate to the transmitter 114 (right tap).

Figure 3:
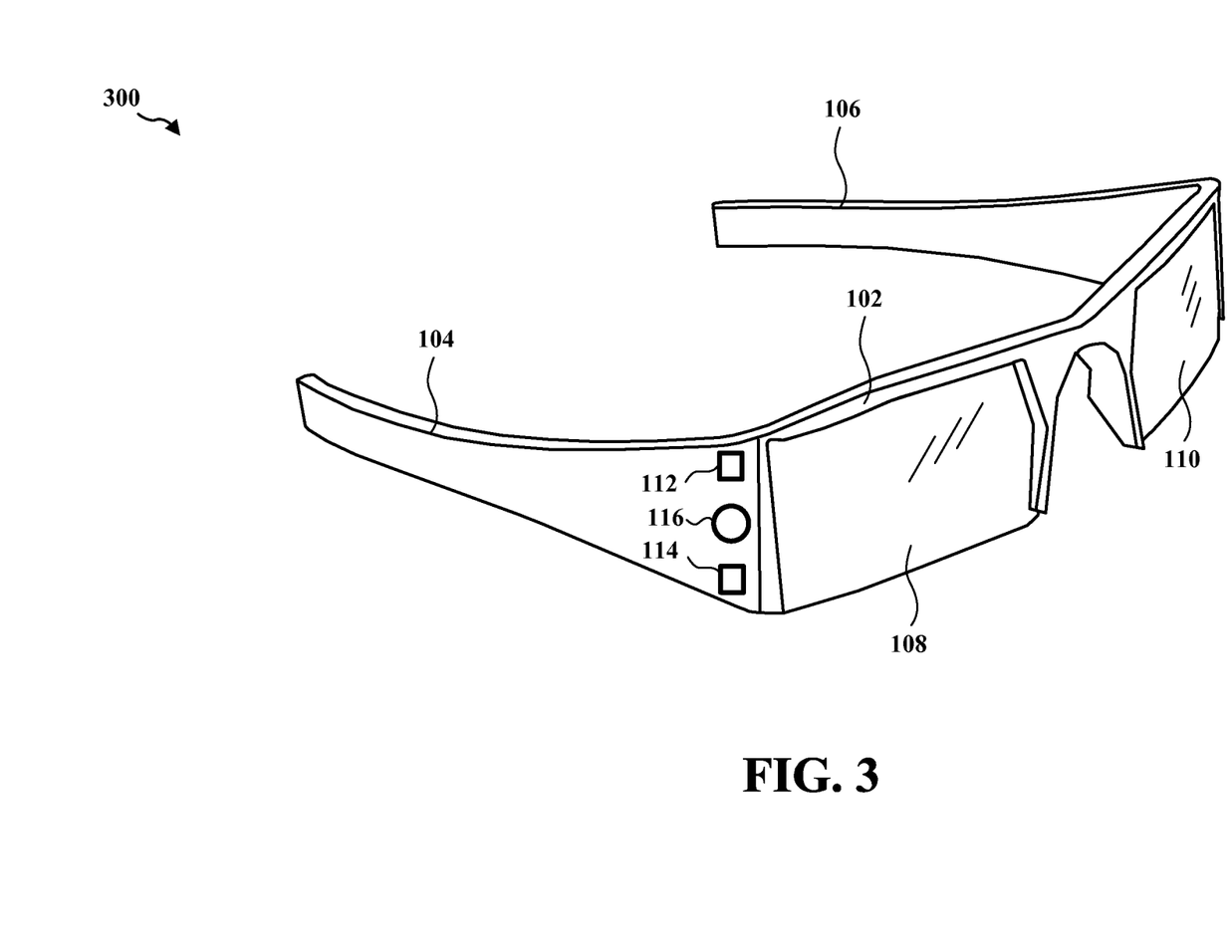
FIG. 3 is a diagram illustrating an optical device configured to display content.

FIG. 3 is a diagram illustrating an optical device 300 configured to display content. In one aspect, the optical device 300 may be configured with a vertical arrangement of transmitters 112 and 114 and a receiver 116 as shown in FIG. 3. In the configuration of FIG. 3, the transmitter 112 is situated above transmitter 114, and the receiver 116 is situated between transmitters 112 and 114. It should be understood that additional or fewer transmitters may be included on optical device 300. The configuration of FIG. 3 may support several contactless gestures, such as a gesture from transmitter 114 to transmitter 112 (upward swipe), a gesture from transmitter 112 to transmitter 114 (downward swipe), a push/pull gesture on or proximate to the receiver 116 (a center tap), a push/pull gesture on or proximate to the transmitter 114 (bottom tap), and a push/pull gesture on or proximate to the transmitter 112 (top tap).

Figure 4:
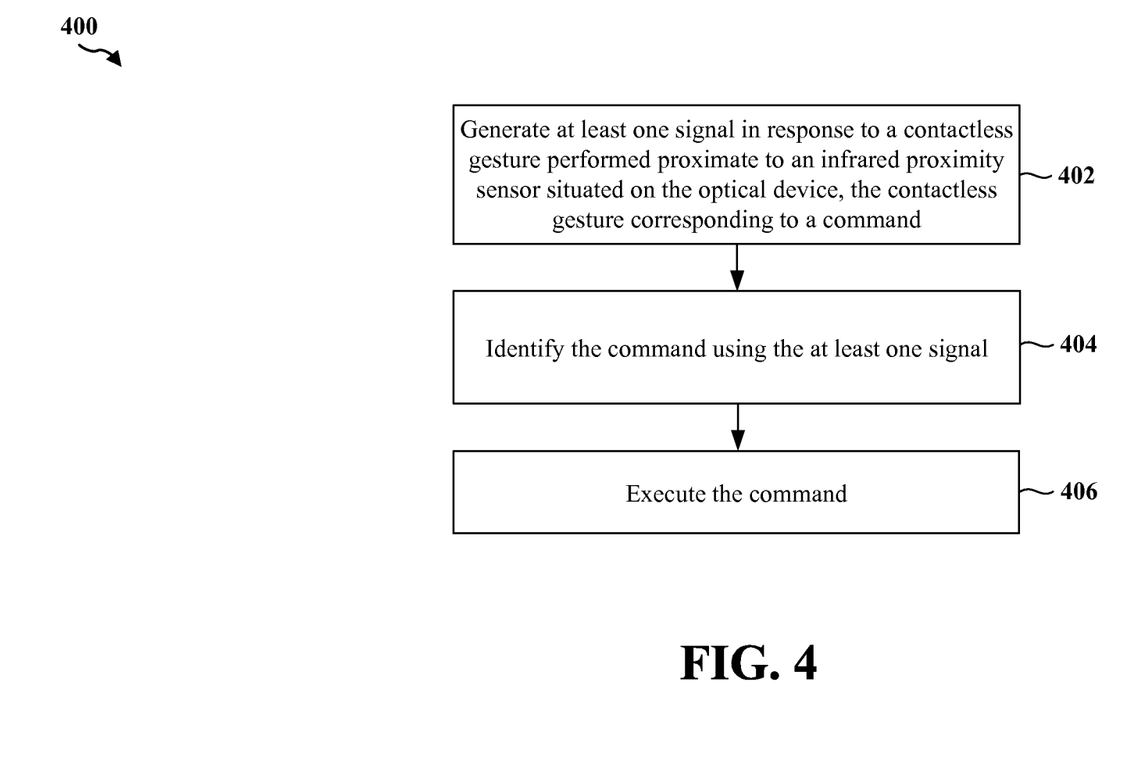
FIG. 4 is a flow chart of a method for controlling an optical device configured to display content.

FIG. 4 is a flow chart 400 of a method for controlling an optical device configured to display content. At step 402, the optical device generates at least one signal in response to a contactless gesture performed proximate to an infrared proximity sensor situated on the optical device. The contactless gesture may correspond to a command. For example, with reference to the optical device 100 shown in FIG. 1, the receiver 116 may sense a signal from each of transmitters 112 and 114, such as signals 118 and 120. For example, the signals 118 and 120 may be IR signals. The user may perform a contactless gesture by obstructing the signal 118 and/or signal 120 with her hand or with one or more of her fingers. The receiver 116 may detect when the signal 118 and/or signal 120 has been obstructed and may generate one or more signals corresponding to the detected obstructions. For example, a user may perform a contactless gesture, such as a right swipe from transmitter 112 to transmitter 114, by first momentarily obstructing signal 118 and then momentarily obstructing signal 120. Accordingly, the receiver 116 may generate a signal corresponding to such a sequence of obstructions of the signals 118 and 120.

In one aspect, the receiver 116 may generate a different signal for each contactless gesture performed by a user, such as a gesture from transmitter 114 to transmitter 112 (left swipe), a gesture from transmitter 112 to transmitter 114 (right swipe), a push/pull gesture on or proximate to the receiver 116 (center tap), a push/pull gesture on or proximate to the transmitter 114 (front tap), and a push/pull gesture on or proximate to the transmitter 112 (rear tap). In another aspect, with reference to FIG. 2, the receiver 116 may generate a different signal for each contactless gesture performed by a user, such as a gesture from transmitter 114 to transmitter 112 (left swipe), a gesture from transmitter 112 to transmitter 114 (right swipe), a push/pull gesture on or proximate to the receiver 116 (center tap), a push/pull gesture on or proximate to the transmitter 112 (left tap), and a push/pull gesture on or proximate to the transmitter 114 (right tap). In another aspect, with reference to FIG. 3, the receiver 116 may generate a different signal for each contactless gesture performed by a user, such as a gesture from transmitter 114 to transmitter 112 (upward swipe), a gesture from transmitter 112 to transmitter 114 (downward swipe), a push/pull gesture on or proximate to the receiver 116 (center tap), a push/pull gesture on or proximate to the transmitter 114 (bottom tap), and a push/pull gesture on or proximate to the transmitter 112 (top tap).

Each contactless gesture may correspond to one or more commands. In one configuration, each signal generated by the receiver 116 in response to a contactless gesture may be mapped to one or more commands. For example, the command may be an action or menu selection that may be executed by an application, such as an AR application, a movie application, or an e-book application.

For example, a right swipe contactless gesture may correspond to a command for zooming out in a camera application or a map application, a command for selecting an item on a list from top to bottom in a media player application, a command for scrolling down a page in an e-book application, and/or a command for setting focus on application icons one by one from left to right in an application menu. A left swipe contactless gesture may correspond to a command for zooming in on a camera application or a map application, a command for selecting an item on a list from bottom to top in a media player application, a command for scrolling up a page in an e-book application, and/or a command for setting focus on application icons one by one from right to left in an application menu. A center tap contactless gesture may correspond to a command for exiting a current application. A front tap contactless gesture may correspond to a command for taking a picture in a camera application, a command accepting a conversation request, a command for going to a next page in an e-book application, and/or a command for increasing the volume in a media player application or during a conversation. A rear tap contactless gesture may correspond to a command for saving a picture in a camera application, a command for rejecting a conversation request, a command for going to a previous page in an e-book application, and/or a command for decreasing the volume in a media player application or during a conversation.

At step 404, the optical device 100 may identify the command using the at least one signal. As previously described, each signal generated by the receiver 116 in response to a contactless gesture may be mapped to one or more commands. Therefore, when a user performs a contactless gesture to input a command, the optical device 100 may use the mapping and the signal generated by the receiver 116 in response to the contactless gesture to identify the command corresponding to generated signal.

Finally, at step 406, the optical device 100 may execute the command. In one aspect, the optical device 100 may execute the command by performing a function for controlling at least one of the content and a UI. For example, the UI may be a graphical user interface (GUI).

Figure 5:
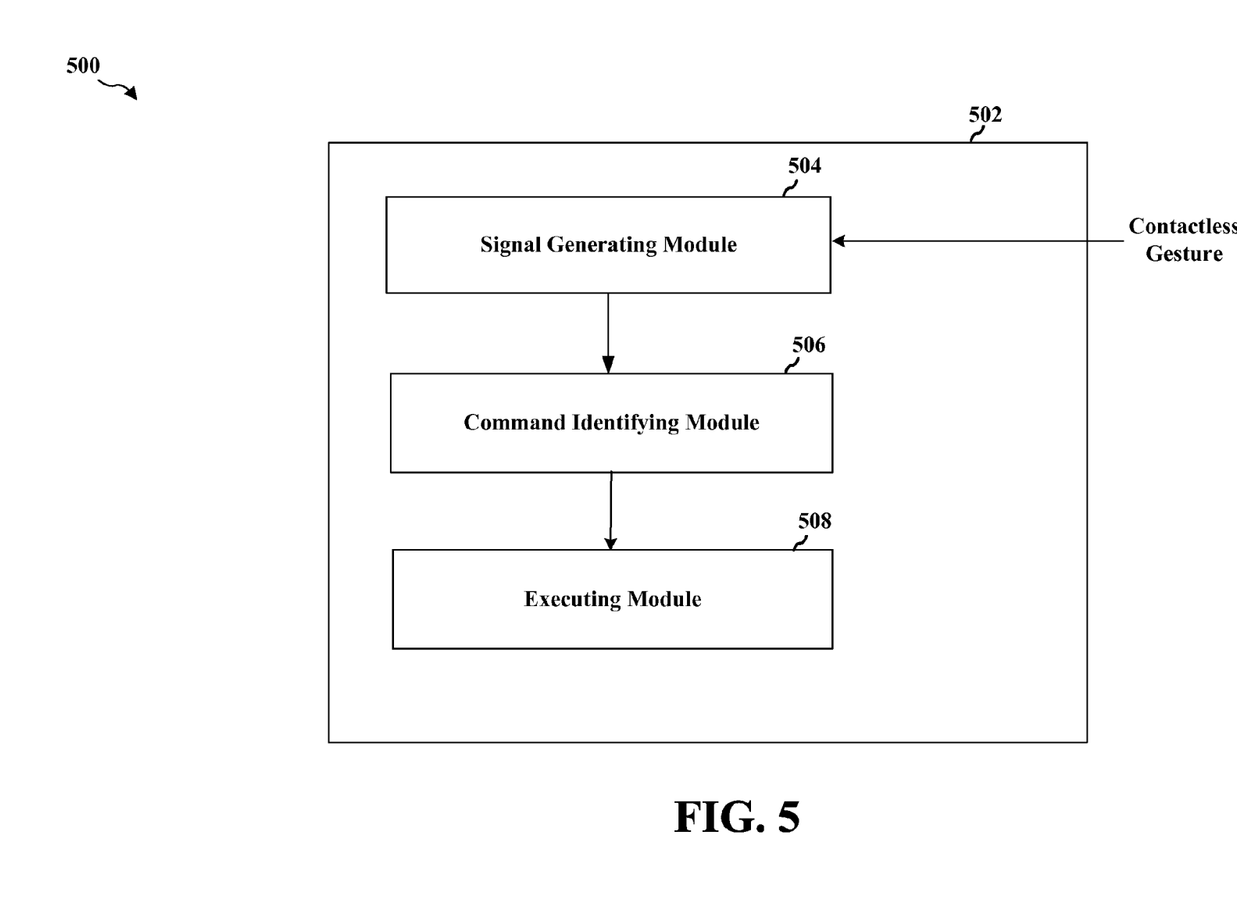
FIG. 5 is a conceptual flow diagram illustrating the operation of different modules/means/components in an exemplary apparatus.

FIG. 5 is a conceptual flow diagram 500 illustrating the operation of different modules/means/components in an exemplary apparatus 502. The apparatus 502 may be an optical device, such as the optical device 100 shown in FIG. 1. The apparatus 502 includes a signal generating module 504, a command identifying module 506, and an executing module 508. The signal generating module 502 generates at least one signal in response to a contactless gesture performed proximate to an infrared proximity sensor situated on the apparatus 502. The contactless gesture may correspond to a command. The command identifying module 506 may identify a command using the at least one signal. The executing module 508 executes the command.

Figure 6:
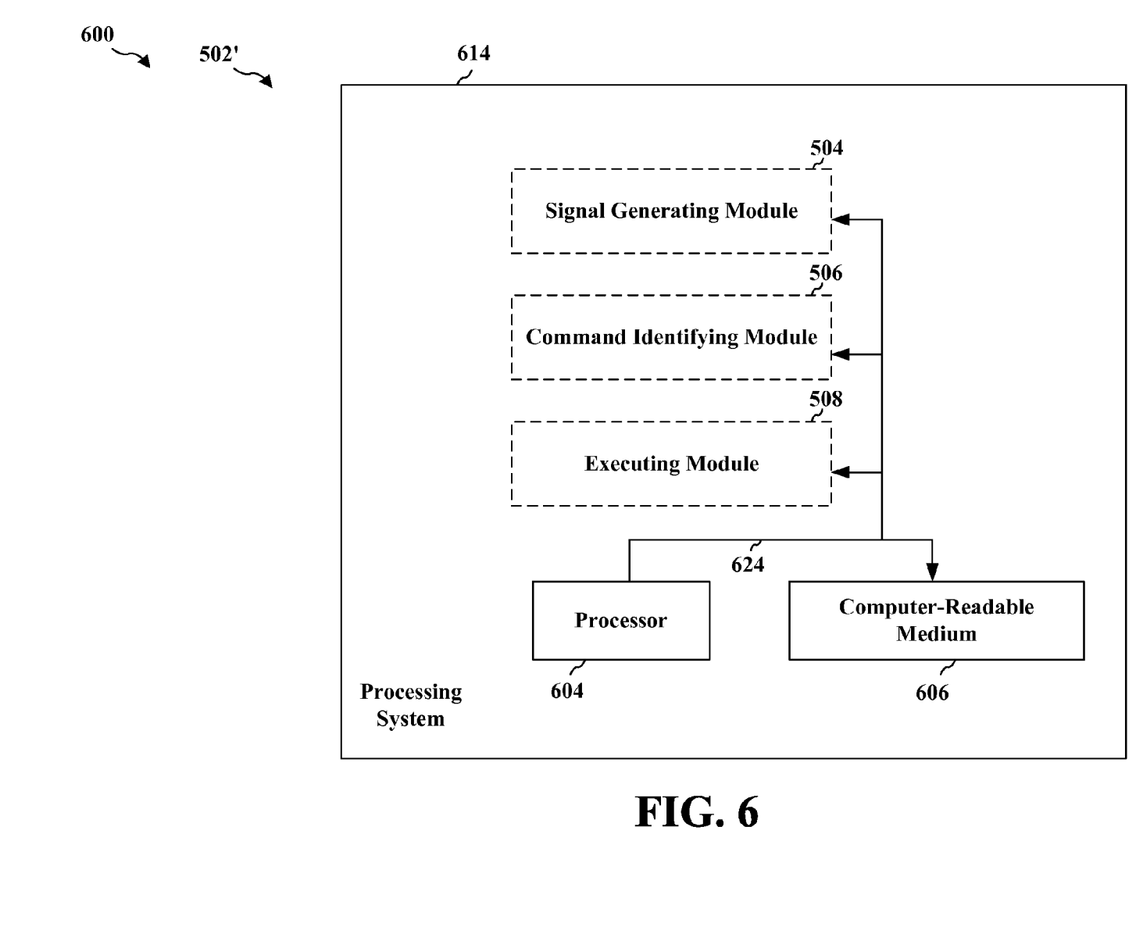
FIG. 6 is a diagram illustrating an example of a hardware implementation for an apparatus employing a processing system.

FIG. 6 is a diagram illustrating an example of a hardware implementation for an apparatus 502' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 604, the modules 504, 506, and 508, and the computer-readable medium 606. The bus 624 may also link various other circuits such as timing sources, peripherals, voltage regulators, and power management circuits, which are well known in the art, and therefore, will not be described any further.

The processing system 614 includes a processor 604 coupled to a computer-readable medium 606. The processor 604 is responsible for general processing, including the execution of software stored on the computer-readable medium 606. The software, when executed by the processor 604, causes the processing system 614 to perform the various functions described supra for any particular apparatus. The computer-readable medium 606 may also be used for storing data that is manipulated by the processor 604 when executing software. The processing system further includes at least one of the modules 504, 506, and 508. The modules may be software modules running in the processor 604, resident/stored in the computer readable medium 606, one or more hardware modules coupled to the processor 604, or some combination thereof.

In one configuration, the apparatus 502/502' includes means for generating at least one signal in response to a contactless gesture performed proximate to an infrared proximity sensor situated on the optical device, the contactless gesture corresponding to a command, means for identifying the command using the at least one signal, and means for executing the command.

The aforementioned means may be one or more of the aforementioned modules of the apparatus 502 and/or the processing system 614 of the apparatus 502' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of controlling an optical device configured as an augmented reality pair of glasses and configured to display content, the method comprising:
    generating one of a plurality of gesture signals in response to a corresponding plurality of different contactless gestures performed proximate to a receiver situated on the pair of glasses between at least first and second infrared light emitting diodes (IR LEDs), the first IR LED transmitting a first signal directly to the receiver, the second IR LED transmitting a second signal directly to the receiver, the receiver configured between the first IR LED and the second IR LED such that the receiver receives the first signal directly from the first IR LED on a first portion of the receiver and receives the second signal directly from the second IR LED on a second portion of the receiver, the gesture signals generated in response to the receiver detecting a sequence of obstructions of the first signal and the second signal transmitted directly to the receiver, each contactless gesture corresponding to a command, wherein each contactless gesture is mapped to a plurality of commands using a mapping, and wherein the plurality of commands comprise actions or menu selections that are executed by an augmented reality application;
    identifying a command from the plurality of commands mapped to the contactless gesture using the generated one of a plurality of different gesture signals and the mapping; and
    executing the command,
    wherein a first gesture signal corresponds to an obstruction of the first signal followed by an obstruction of the second signal, and a second gesture signal corresponds to an obstruction of the second signal followed by an obstruction of the first signal.

2. The method of claim 1, wherein the contactless gesture is at least one of a left swipe, a right swipe, an upward swipe, and a downward swipe.

3. The method of claim 1, wherein executing the command comprises performing a function for controlling at least one of the content and a graphical user interface (GUI).

4. The method of claim 1, wherein the content is one of augmented reality information, an electronic book (e-book), or a movie.

5. The method of claim 1, wherein the receiver is situated on one or more of a front portion of the pair of glasses and a side portion of the pair of glasses and the contactless gesture is performed at the front portion or the side portion.

6. An apparatus for controlling an optical device configured as an augmented reality pair of glasses and configured to display content, the apparatus comprising:
    means for generating one of a plurality of gesture signals in response to a corresponding plurality of different contactless gestures performed proximate to a receiver situated on the pair of glasses between at least first and second infrared light emitting diodes (IR LEDs), the first IR LED transmitting a first signal directly to the receiver, the second IR LED transmitting a second signal directly to the receiver, the receiver configured between the first IR LED and the second IR LED such that the receiver receives the first signal directly from the first IR LED on a first portion of the receiver and receives the second signal directly from the second IR LED on a second portion of the receiver, the gesture signals generated in response to the receiver detecting a sequence of obstructions of the first signal and the second signal transmitted directly to the receiver, each contactless gesture corresponding to a command, wherein each contactless gesture is mapped to a plurality of commands using a mapping, and wherein the plurality of commands comprise actions or menu selections that are executed by an augmented reality application;
    means for identifying a command from the plurality of commands mapped to the contactless gesture using the generated one of a plurality of different gesture signals and the mapping; and
    means for executing the command,
    wherein a first gesture signal corresponds to an obstruction of the first signal followed by an obstruction of the second signal, and a second gesture signal corresponds to an obstruction of the second signal followed by an obstruction of the first signal.

7. The apparatus of claim 6, wherein the contactless gesture is at least one of a left swipe, a right swipe, an upward swipe, and a downward swipe.

8. The apparatus of claim 6, wherein the means for executing the command is configured to perform a function for controlling at least one of the content and a graphical user interface (GUI).

9. The apparatus of claim 6, wherein the content is one of augmented reality information, an electronic book (e-book), or a movie.

10. The apparatus of claim 6, wherein the receiver is situated on one or more of a front portion of the pair of glasses and a side portion of the pair of glasses and the contactless gesture is performed at a the front portion or the side portion.

11. An apparatus for controlling an optical device configured as an augmented reality pair of glasses and configured to display content, the apparatus comprising:
    a processing system configured to:
        generate one of a plurality of gesture signals in response to a corresponding plurality of different contactless gestures performed proximate to a receiver situated on the pair of glasses between at least first and second infrared light emitting diodes (IR LEDs), the first IR LED transmitting a first signal directly to the receiver, the second IR LED transmitting a second signal directly to the receiver, the receiver configured between the first IR LED and the second IR LED such that the receiver receives the first signal directly from the first IR LED on a first portion of the receiver and receives the second signal directly from the second IR LED on a second portion of the receiver, the gesture signals generated in response to the receiver detecting a sequence of obstructions of the first signal and the second signal transmitted directly to the receiver, each contactless gesture corresponding to a command, wherein each contactless gesture is mapped to a plurality of commands using a mapping, and wherein the plurality of commands comprise actions or menu selections that are executed by an augmented reality application;

identifying a command from the plurality of commands mapped to the contactless gesture using the generated one of a plurality of different gesture signals and the mapping; and execute the command, wherein a first gesture signal corresponds to an obstruction of the first signal followed by an obstruction of the second signal, and a second gesture signal corresponds to an obstruction of the second signal followed by an obstruction of the first signal.

12. The apparatus of claim 11, wherein the contactless gesture is at least one of a left swipe, a right swipe, an upward swipe, and a downward swipe.

13. The apparatus of claim 11, wherein the processing system is configured to execute the command by performing a function for controlling at least one of the content and a graphical user interface (GUI).

14. The apparatus of claim 11, wherein the content is one of augmented reality information, an electronic book (e-book), or a movie.

15. The apparatus of claim 11, wherein the receiver is situated on one or more of a front portion of the pair of glasses and a side portion of the pair of glasses and the contactless gesture is performed at the front portion the side portion.

16. A non-transitory processor-readable storage medium having stored thereon processor-executable instructions configured to cause a processor of an optical device configured as an augmented reality pair of glasses, the optical device configured to display content, to perform operations comprising:

generating one of a plurality of gesture signals in response to a corresponding plurality of different contactless gestures performed proximate to a receiver situated on the pair of glasses between at least first and second infrared light emitting diodes (IR LEDs), the first IR LED transmitting a first signal directly to the receiver, the second IR LED transmitting a second signal directly to the receiver, the receiver configured between the first IR LED and the second IR LED such that the receiver receives the first signal directly from the first IR LED on a first portion of the receiver and receives the second signal directly from the second IR LED on a second portion of the receiver, each gesture signal generated in response to the receiver detecting a sequence of obstructions of the first signal and the second signal transmitted directly to the receiver, each contactless gesture corresponding to a command, wherein the contactless gesture is mapped to a plurality of commands using a mapping, and wherein the plurality of commands comprise actions or menu selections that are executed by an augmented reality application;

identifying a command from the plurality of commands mapped to the contactless gesture using the generated one of a plurality of different gesture signals and the mapping; and executing the command, wherein a first gesture signal corresponds to an obstruction of the first signal followed by an obstruction of the second signal, and a second gesture signal corresponds to an obstruction of the second signal followed by an obstruction of the first signal.

17. The non-transitory processor-readable storage medium of claim 16, wherein the contactless gesture is at least one of a left swipe, a right swipe, an upward swipe, and a downward swipe.

18. The non-transitory processor-readable storage medium of claim 16, wherein the stored processor-executable instructions are configured to cause the processor to perform operations such that:

executing the command comprises performing a function for controlling at least one of the content and a graphical user interface (GUI).

19. The non-transitory processor-readable storage medium of claim 16, wherein the content is one of augmented reality information, an electronic book (e-book), or a movie.

20. The non-transitory processor-readable storage medium of claim 16, wherein the receiver is situated on one or more of a front portion of the pair of glasses and a side portion of the pair of glasses and the contactless gesture is performed at the front portion or the side portion.

21. The method of claim 1, wherein the first portion of the receiver and the second portion of the receiver are opposite sides of the receiver.

22. The method of claim 1, wherein the pair of glasses comprises a first temple portion and a second temple portion, and the receiver, the first IR LED, and the second IR LED are situated on the first temple portion.

* * * * *